(12) United States Patent
Fischer et al.

(10) Patent No.: US 7,342,481 B2
(45) Date of Patent: Mar. 11, 2008

(54) METHOD AND CIRCUIT ARRANGEMENT FOR WIRELESS DATA TRANSMISSION

(75) Inventors: Martin Fischer, Pfedelbach (DE); Ulrich Friedrich, Ellhofen (DE)

(73) Assignee: Atmel Germany, GmbH, Heilbronn (DE)

( * ) Notice: Subject to any disclaimer, the term of this patent is extended or adjusted under 35 U.S.C. 154(b) by 347 days.

(21) Appl. No.: 11/045,322

(22) Filed: Jan. 31, 2005

(65) Prior Publication Data

US 2005/0168324 A1    Aug. 4, 2005

(30) Foreign Application Priority Data

Feb. 3, 2004    (DE) .................. 10 2004 006 446

(51) Int. Cl.
*H04Q 5/22* (2006.01)
(52) U.S. Cl. .................. 340/10.3; 342/42; 375/146
(58) Field of Classification Search ........... 340/10.3; 375/146; 342/42
See application file for complete search history.

(56) References Cited

U.S. PATENT DOCUMENTS 5,596,601 A * 1/1997 Bar-David .................. 375/143
5,663,956 A * 9/1997 Schilling .................... 370/335
5,842,118 A * 11/1998 Wood, Jr. ................... 455/101
6,055,266 A * 4/2000 Nakamura .................. 375/140

FOREIGN PATENT DOCUMENTS

| DE | 31 46 037 A1 | 6/1982 |
| DE | 40 35 398 A1 | 5/1992 |
| DE | 196 19 246 C1 | 7/1997 |
| DE | 198 34 342 A1 | 2/2000 |
| DE | 100 56 192 A1 | 5/2002 |

* cited by examiner

*Primary Examiner*—Edwin C. Holloway, III
(74) *Attorney, Agent, or Firm*—Muncy, Geissler, Olds & Lowe, PLLC

(57) ABSTRACT

A method and circuit for wireless data transmission between a base station and one or more transponders is provided in which the base station modulates a carrier signal with a modulation signal and transmits it, in which symbols that are to be transmitted are coded by the base station using sequential delimiters. A value of a particular symbol being determined by the time period between two sequential delimiters, and in which the particular delimiter is generated by changing the modulation signal during a modulation period. Whereby, the modulation signal is preferably a noise signal during the modulation period.

12 Claims, 1 Drawing Sheet

METHOD AND CIRCUIT ARRANGEMENT FOR WIRELESS DATA TRANSMISSION

This nonprovisional application claims priority under 35 U.S.C. § 119(a) on German Patent Application No. DE 102004 006 446, which was filed in Germany on Feb. 3, 2004, and which is herein incorporated by reference.

BACKGROUND OF THE INVENTION

1. Field of the Invention

The present invention relates to a method for wireless data transmission between a base station and one or more transponders.

2. Description of the Background Art

Transmissions between one or more base stations or readers and one or more transponders can be found in, for example, contactless identification systems or so-called radio frequency identification (RFID) systems. Sensors, for example, for temperature measurement, may also be integrated in the transponders. Such transponders can also be referred to as remote sensors.

Transponders and their transmitting and receiving devices typically do not have an active transmitter for data transmission to the base station. Such non-active systems are called passive systems if they do not have their own energy supply, and semi-passive systems if they have their own energy supply. Passive transponders take the energy they require for their supply from an electromagnetic field, which is emitted by the base station.

In general, so-called backscatter coupling is used to transmit data from a transponder to the base station using UHF or microwaves in the far field of the base station. To this end, the base station emits electromagnetic carrier waves, which the transmitting and receiving device in the transponder modulates and reflects appropriately for the data to be transmitted to the base station using a modulation method. The typical modulation methods for this purpose are amplitude modulation, phase modulation, and amplitude shift keying (ASK) subcarrier modulation, in which the frequency or the phase position of the subcarrier is changed.

To transmit data from the base station to one or more transponders, symbols that are to be transmitted can be coded by the base station using a sequence of delimiters or so-called "notches." The value of a symbol here is determined, for example, by the interval or the period between two sequential delimiters. For example, if the period is greater than a settable threshold value, the value of the symbol is "1," otherwise it is "0."

A variety of methods are known for producing the delimiters. In general, the carrier signal is amplitude-modulated and/or phase-modulated with a modulating signal by the base station. A delimiter is typically detected in a transponder using what is known as a receiver signal strength indicator (RSSI) circuit.

On-off keying (OOK) is a method based on amplitude modulation, in which the modulation signal is completely suppressed or blanked during a certain modulation period of the carrier signal. However, in this technique the modulated signal has a relatively broad-band spectrum. In passive systems, which take the energy required for their supply from the carrier signal, the energy supply is also completely suppressed during the modulation period, thus correspondingly reducing the achievable range. It is not possible to arbitrarily reduce the modulation period during which the carrier signal is blanked to any desired degree, however, since this increases the required bandwidth.

Methods for increasing the transmission range are known which do not completely blank the carrier signal during the modulation period, i.e., which have a modulation index that is less than one. However, this leads to a decrease in the reliability of transmission, since the delimiters can no longer be detected as reliably as with complete blanking.

To reduce the bandwidth required, the modulation signal can have a sinusoidal shape during the modulation period, i.e. the carrier signal is not blanked with a square-wave function, but instead is switched off and back on with a sinusoidal profile.

If a phase modulation method is used for modulation, the phase position of the carrier signal can be rotated by 180 degrees, for example, as in the method known as double sideband modulation (DSBM), to produce the delimiters. If this phase change during the modulation period takes place in a sinusoidal rather than an abrupt manner, the energy supply for the transponder can be improved in this way and the required bandwidth is reduced. The sidebands produced as a result of the sinusoidal change in the phase position limit the maximum transmission rate, however.

SUMMARY OF THE INVENTION

It is therefore an object of the present invention to provide a method and a circuit arrangement for wireless data transmission, which can achieve comparatively high transmission rates with improved utilization of the available bandwidth and permit a long transmission range.

In a preferred embodiment of the invention, the modulation signal during the modulation period is a noise signal. The method for producing a delimiter, according to a preferred embodiment, results in sidebands with only a small amount of energy, which lie far outside the useful spectrum, and thus can be filtered out easily. The limitation of the transmission rate caused by the sidebands is thus largely eliminated. Moreover, a short modulation period can be chosen so that the time periods during which the carrier signal is blanked can be kept short. This increases the achievable transmission range. The method can be used with amplitude modulation and/or phase modulation. The circuit arrangement according to the invention is particularly suitable for carrying out the method.

In a further development of the invention, the average value of the noise signal over time is constant.

In a further development of the invention, the modulation signal has the same modulation states before and after a change. In this way, for example, it is possible to simulate on-off keying that has a narrower usable bandwidth than when it is produced conventionally.

In a further development of the invention, the modulation signal has different modulation states before and after the change. In this way, for example, it is possible to simulate double sideband modulation that has no interfering sidebands.

In a further development of the invention, a random number sequence is generated to produce the noise signal, and this number sequence is converted into the noise signal by a digital-to-analog converter. This makes it possible to generate a noise signal in a simple and cost-effective manner. A random number sequence is advantageously generated using a linear feedback shift register or a chaotic counter. A chaotic counter is a component that outputs a chaotic sequence of values beginning with a start value. For example, a chaotic counter can be constructed as a ripple counter whose power consumption is small. The random number sequence can also be calculated once and stored in a storage area of the base station. For example, the calculation can take place on a conventional personal computer. In this way, generation of the random number sequence at run time can be eliminated, saving the circuit components required for this purpose.

In a further development of the circuit arrangement, the modulation signal generation unit comprises a linear feedback shift register or a chaotic counter for generating a random number sequence and a digital-to-analog converter for converting the random number sequence into the noise signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figures 1, 2:
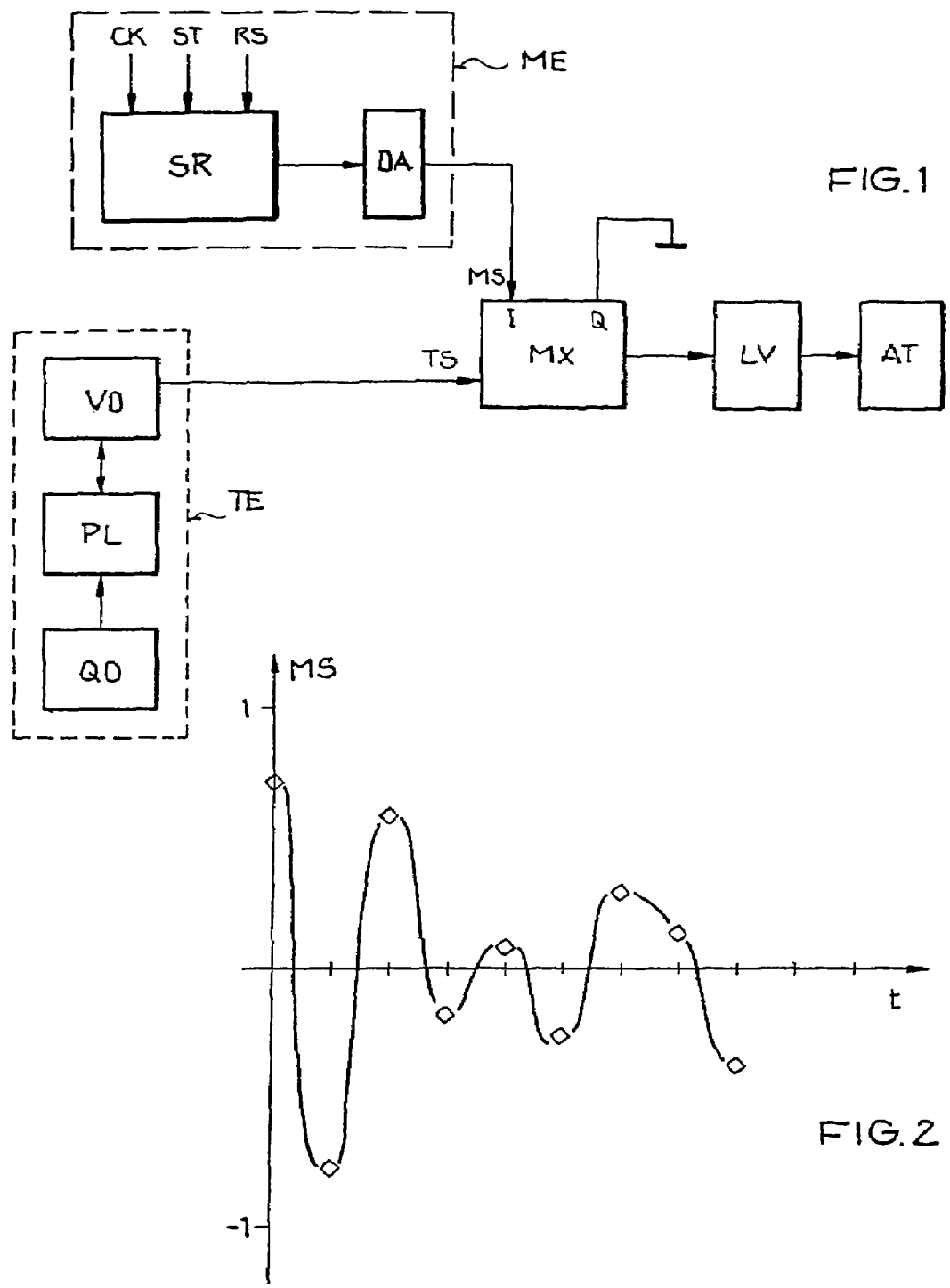
FIG. 1 is a block diagram of a circuit arrangement for wireless data transmission integrated in a base station, according to a preferred embodiment of the present invention.
FIG. 2 is a diagram of a modulation signal that is present at an input of a mixer from FIG. 1.

The circuit arrangement shown in FIG. 1 is integrated in a base station (not shown) and comprises a carrier signal generation unit TE, a modulation signal generation unit ME, an IQ mixer MX, and a power amplifier LV whose output signal is applied to an antenna AT.

The carrier signal generation unit TE is constructed in a conventional way and includes a quartz oscillator QO, a phase-locked loop PL and a voltage-controlled oscillator VO to generate a high-frequency carrier signal TS. The carrier signal TS is applied to a carrier signal input of the mixer MX.

The modulation signal generation unit ME includes a linear feedback shift register SR with a width of 10 bits and a digital-to-analog converter DA to generate a modulation signal MS. A clock signal CK, a start signal ST and a reset signal RS are applied to the shift register SR. The modulation signal MS is applied to the modulation input of the mixer MX labeled I, and the input of the mixer MX labeled Q is connected to ground. This circuit effects phase modulation of the carrier signal TS with the modulation signal MS.

The output signal of the mixer MX is amplified by the frequency-selective power amplifier LV and then radiated by the antenna AT. The power amplifier LV has a bandpass characteristic.

For data transmission from the base station to one or more transponders, symbols to be transmitted are coded using sequential delimiters. In an advantageous embodiment, the value of a symbol is determined by the period between two sequential delimiters. If the period is greater than a settable threshold value, the value of the symbol is "1," otherwise it is "0."

To produce the delimiters, the signals ST and RS are suitably controlled at the shift register, which causes the shift register SR to generate, at the rate of the clock signal CK, a random number sequence, which is to say a time-discrete sequence of digital values, that is applied to a digital input of the digital-to-analog converter DA. The digital-to-analog converter DA converts the random number sequence into the modulation signal MS. The modulation signal MS represents a noise signal whose average value is 0. The modulation period, which is to say the period during which the modulation signal MS is a noise signal, is approximately 1 µs. The modulation signal has modulation states before and after a change that are constant in time and have the same value but different arithmetic signs, resulting in a phase rotation of the carrier signal TS by 180°. This corresponds to a DSBM but with significantly reduced sidebands, which lie outside the useful spectrum.

FIG. 2 shows a diagram of a time segment of the modulation signal MS. The modulation signal MS is a result of digital-to-analog conversion of the random number sequence generated by the shift register SR. The individual values of a segment of the random number sequence are represented in the diagram by diamonds. The values change at the rate of the clock signal CK.

The frequency spectrum of the modulation signal MS in the region of the respective delimiters is random, and results from the frequency of the clock signal CK and the input values of the digital-to-analog converter DA, i.e. the values of the random number sequence. The spectrum of the output signal of the mixer MX includes the frequency of the carrier signal TS and its product with the frequency of the clock signal CK. For example, if the transmission frequency between the base station and transponder lies in a range from 10 kHz to 100 kHz, the frequency of the clock signal CK can be chosen as 10 MHz. Since the frequency of the clock signal CK is far higher than the transmission frequency, the modulation products can simply be filtered out by a bandpass filter. The latter can be arranged ahead of the power amplifier LV or directly ahead of the antenna AT, for example.

The example embodiment shown is based on phase modulation in which the phase position of the carrier signal TS is rotated by 180° to generate the delimiters, with the phase position taking on random values during the modulation period. Of course, the invention is not limited to phase-modulated systems and can also be used for amplitude-modulated systems, for example.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for wireless data transmission between a base station and one or more transponders, the method comprising:

modulating, by the base station, a carrier signal with a modulation signal; and transmitting the modulated carrier signal, wherein symbols that are to be transmitted by the base station are coded using sequential delimiters, the value of a particular symbol being determined by a time period between two sequential delimiters, wherein a delimiter of the sequential delimiters is generated by changing the modulation signal during a modulation period, wherein the modulation signal during the modulation period is a noise signal, and wherein a random number sequence, which is converted into the noise signal by a digital-to-analog converter, is generated to produce the noise signal.

2. The method according to claim 1, wherein an average value of the noise signal over time is constant.

3. The method according to claim 1, wherein the modulation signal has substantially the same modulation states before and after a change.

4. The method according to claim 1, wherein the modulation signal has different modulation states before and after the change.

5. The method according to claim 1, wherein the random number sequence is generated using a linear feedback shift register or a chaotic counter.

6. The method according to claim 1, wherein the random number sequence is calculated in advance and stored in a storage area of the base station.

7. A circuit arrangement for wireless data transmission between a base station and one or more transponders comprising:

a carrier signal generation unit for producing a carrier signal;

a modulation signal generation unit for producing a modulation signal; and a mixer unit for modulating the carrier signal with the modulation signal, wherein the modulation signal generation unit produces a noise signal as the modulation signal, wherein the modulation signal generation unit generates a random number sequence, and wherein the modulation signal generation unit comprises a digital-to-analog converter for converting the random number sequence into the noise signal.

8. The circuit arrangement according to claim 7, wherein the modulation signal generation unit comprises a linear feedback shift register or a chaotic counter for generating the random number sequence.

9. The method according to claim 1, wherein an average value of the noise signal over time is zero (0).

10. The method according to claim 1, wherein the modulation period is substantially 1 µs.

11. The method according to claim 1, wherein the random number sequence is generated using a chaotic counter.

12. The circuit arrangement according to claim 7, wherein the modulation signal generation unit comprises a chaotic counter for generating the random number sequence.

* * * * *